Patented Jan. 8, 1946

2,392,401

UNITED STATES PATENT OFFICE 2,392,401

DAIRY PROCESS

Gerald C. North, Evanston, and Alvin J. Alton, Chicago, Ill., assignors to Beatrice Creamery Company, Chicago, Ill., a corporation of Delaware No Drawing. Application July 29, 1942,
Serial No. 452,807

6 Claims. (Cl. 99—54)

This invention relates to powdered milk of superior keeping qualities and methods for making the same. The primary object of the invention is to provide a method whereby powdered milk may be prepared having markedly improved keeping qualities and freedom from oxidation.

In the manufacture of powdered whole milk by conventional methods, it is customary to expose the milk to a heat treatment in the general range of 170° to 180° F. maintained for 15 to 30 minutes for the sake of developing anti-oxidant properties in the milk so that when it is subsequently condensed and spray-dried, it will result in a powdered milk which has enhanced keeping qualities, i. e., is slower to develop an oxidized or tallowy flavor.

We have discovered that when milk is separated into skim milk and cream, the cream will contain a very substantial portion of the mother substance from which such anti-oxidant products may be developed by suitable heat treatment. We have further discovered that after such anti-oxidant principles have been developed, they will be reduced in amount and effectiveness by vacuum condensing or extensive aeration.

Accordingly, this invention consists in the process of separating the milk into skim milk and cream, exposing both to the desired heat treatment, but never exposing the cream portion to vacuum condensing or extensive aeration as is commonly practiced for the purpose of increasing the concentration of solids. In our invention, only the skim milk portion is concentrated by such means and the heat treated cream is subsequently restored to such heat treated concentrated skim milk and the mixture is then dried to a powdered milk as by spray-drying.

In carrying out the invention, the milk is by centrifugal separation separated into skim milk and cream. The skim milk is given the usual forewarming heat treatment as well known in conventional dairy practice, and is then condensed to a concentration of substantially 30 to 32% solids. This condensing is usually carried out in a vacuum pan, but may also be accomplished by having the escaping hot air from the spray drying chamber pass through streams of the heated skim milk which is to be concentrated. The concentrated skim milk is then heated at 170° to 180° F. for 15 to 30 minutes.

The concentrated skim milk is combined with its proportionate amount of cream which has in the meantime been heat treated at 170° to 180° F. for 15 to 30 minutes. An alternative procedure is to combine the cream with the concentrated skim milk which has not been subjected to the last heating step and subject this mixture to the above heat treatment.

As previously explained, the cream and milk may be heated separately before being combined and they may be combined and heated together prior to spray drying. Where we refer in the claims to "heating and combining" the cream and skim milk, we intend to cover either heating the two separately, and then combining, or combining and then heating.

It is a desirable practice, although not essential to our invention, to homogenize this mixture formed by either method, before the final step of reducing the fluid to a powder by spray-drying.

It appears that the improved keeping qualities are due to the greater retention of anti-oxidant properties developed from the heat treatment applied as disclosed, and wherein the cream portion of the milk is at no time subjected to the usual condensing or aeration.

The process described herein is useful in connection with the process disclosed in our copending application filed of even date herewith and relating to the use of phosphatides in the production of fat-containing powdered dairy products. In said application (Serial No. 452,806), there is described a powdered fat containing dairy product in which the particles have dispersed therein added lecithin in amount of substantially 0.25 to 3.0% based on the dry weight of the powder, the product being in the form of powdered milk or powdered cream, for example, and being capable of rehydration to produce a fluid having the freshness and richness of flavor of the original lacteal fluid. In the case of powdered milk, the product has the outstanding characteristic of being devoid of chalkiness and in the case of powdered cream, this is completely soluble in cold water with mild stirring. In some cases, the particles of the powdered fat-containing dairy product have dispersed therein the added lecithin dissolved in fat derived from milk, the lecithin being present in amount of substantially 0.25 to 3.0% based on the dry weight of the powder.

The product is prepared by dispersing the lecithin in the lacteal fluid in amount to produce in the dried powdered product substantially 0.25 to 3.0% based on the dry weight of the powder and then drying the fluid to a powder having the enriched lecithin content. Where the lecithin is dissolved in fat derived from milk, the fat-containing lecithin is dispersed in the lacteal fluid and the fat employed is taken as part of the amount of fat computed as necessary to obtain the desired fat content in the finished product.

We claim:

1. The process of making milk powder from whole milk consisting in first separating the whole milk into fluid cream and skim milk portions, condensing the separated skim milk portion, heating the condensed separated skim milk portion at 170° to 180° F. for 15 to 30 minutes, heating the separated cream portion at 170° F. to 180° F. for 15 to 30 minutes combining the separate heat treated concentrated skim milk portion and the separate heat treated cream portion and then drying the mixture to a powder.

2. The process according to claim 1 wherein the separated skim milk is condensed to a concentration of substantially 30 to 32% solids.

3. The process according to claim 1 wherein the separated skim milk is condensed to a concentration of substantially 30 to 32% solids, and the separated cream portion is never exposed to vacuum treatment or extensive aeration.

4. The process of making milk powder from whole milk consisting in first separating the whole milk into fluid cream and skim milk portions, condensing the separated skim milk portion, then mixing the milk and cream portions, heating the mixture of the condensed separated skim milk portion and the separated cream portion at 170° to 180° F. for 15 to 30 minutes and then drying the mixture to a powder.

5. The process according to claim 4 wherein the separated skim milk is condensed to a concentration of substantially 30 to 32% solids.

6. The process according to claim 4 wherein the separated skim milk is condensed to a concentration of substantially 30 to 32% solids, and the separated cream portion is never exposed to vacuum treatment or extensive aeration.

GERALD C. NORTH.
ALVIN J. ALTON.